(12) United States Patent
Washington

(10) Patent No.: US 10,463,999 B2
(45) Date of Patent: Nov. 5, 2019

(54) METHODS, DEVICES, AND SYSTEMS FOR FILTERING HYDROCARBONS

(71) Applicant: Clean Fuel Screen Company LLC, San Diego, CA (US)

(72) Inventor: Ernest Washington, San Diego, CA (US)

(73) Assignee: Clean Fuel Screen Company LLC, San Diego, CA (US)

(\*) Notice: Subject to any disclaimer, the term of this patent is extended or adjusted under 35 U.S.C. 154(b) by 867 days.

(21) Appl. No.: 14/588,840

(22) Filed: Jan. 2, 2015

(65) Prior Publication Data

US 2015/0190741 A1   Jul. 9, 2015

Related U.S. Application Data

(60) Provisional application No. 61/923,525, filed on Jan. 3, 2014.

(51) Int. Cl.
*B01D 35/00* (2006.01)
*B67D 7/76* (2010.01)

(52) U.S. Cl.
CPC ............ *B01D 35/005* (2013.01); *B67D 7/76* (2013.01); *B01D 2201/02* (2013.01)

(58) Field of Classification Search
None
See application file for complete search history.

(56) References Cited

U.S. PATENT DOCUMENTS

| | | | | |
|---|---|---|---|---|
| 1,115,016 A | * | 10/1914 | Pheils | B65F 1/1447 |
| | | | | 193/11 |
| 1,155,070 A | * | 9/1915 | Kessler | B60K 15/04 |
| | | | | 137/588 |
| 1,177,277 A | * | 3/1916 | Schaub | B01D 35/027 |
| | | | | 210/172.6 |
| 1,192,134 A | * | 7/1916 | Stevens | G01F 23/58 |
| | | | | 137/588 |
| 1,217,732 A | * | 2/1917 | Fedders | F28D 1/0358 |
| | | | | 123/41.27 |
| 1,218,975 A | * | 3/1917 | Brison | B01D 29/15 |
| | | | | 210/448 |
| 1,225,993 A | | 5/1917 | Mullaney | |
| 1,415,217 A | * | 5/1922 | Brock | B60K 15/04 |
| | | | | 210/172.6 |
| 1,436,294 A | * | 11/1922 | Scott | B60K 15/0406 |
| | | | | 210/473 |
| 1,451,136 A | * | 4/1923 | Allnutt | F01P 11/0214 |
| | | | | 137/526 |

(Continued)

OTHER PUBLICATIONS

"Briggs and Stratton Filler Neck Fuel Tank Filter 792917", http://briggsenginespares.com/fuel-tank-filter-792917.html, Accessed Oct. 10, 2014.

(Continued)

*Primary Examiner* — Robert J Popovics
(74) *Attorney, Agent, or Firm* — Wilson Sonsini Goodrich & Rosati

(57) ABSTRACT

Described herein are methods, devices, and systems for use in filtering hydrocarbons to remove impurities, particulates, and contaminates using an elongated tube to reduce or avoid significant damage to the fuel system and other critical operative components of a vehicle.

5 Claims, 14 Drawing Sheets

(56) References Cited

U.S. PATENT DOCUMENTS

| | | | | |
|---|---|---|---|---|
| 1,553,395 A * | 9/1925 | Ressler | A62C 4/00 | 137/493.3 |
| 1,570,461 A * | 1/1926 | Cohn | A62C 4/00 | 220/88.2 |
| 1,581,947 A * | 4/1926 | Hobbs | B01D 35/023 | 210/451 |
| 1,596,362 A * | 8/1926 | McDonald | B01D 35/023 | 210/305 |
| 1,604,048 A * | 10/1926 | Hobbs | B01D 35/023 | 210/172.6 |
| RE16,994 E * | 6/1928 | Cohn | F16K 24/04 | 210/172.6 |
| 1,677,118 A * | 7/1928 | Ford | B01D 29/23 | 210/457 |
| 1,711,093 A * | 4/1929 | Helman | B01D 35/023 | 210/314 |
| 1,757,285 A * | 5/1930 | Anschicks | F16K 17/19 | 210/172.6 |
| 1,814,656 A * | 7/1931 | Anschicks | B65D 25/385 | 210/172.6 |
| 1,862,815 A * | 6/1932 | Buddenbrock | B60K 15/0403 | 220/86.2 |
| 1,976,975 A * | 10/1934 | Williams | B60K 15/0403 | 210/172.6 |
| 2,010,445 A * | 8/1935 | Sparks | B60K 15/04 | 210/172.6 |
| 2,145,759 A * | 1/1939 | Fellows | B60K 15/0403 | 210/172.6 |
| 2,172,031 A * | 9/1939 | Norman | B01D 35/023 | 210/472 |
| 2,275,318 A * | 3/1942 | Hans | B65D 25/385 | 222/474 |
| 2,351,526 A * | 6/1944 | Lebus | B60K 15/0406 | 210/172.6 |
| 2,356,327 A * | 8/1944 | Lebus | F16K 17/196 | 220/203.26 |
| 2,379,735 A * | 7/1945 | Meikle | B60K 15/0406 | 210/172.6 |
| 2,409,928 A * | 10/1946 | Cahenzli, Jr. | F25B 43/00 | 210/172.2 |
| 2,524,313 A * | 10/1950 | Gerling | B60K 15/04 | 116/228 |
| 2,647,636 A * | 8/1953 | Rafferty | B01D 35/023 | 210/238 |
| 2,733,775 A * | 2/1956 | Dupure | B01D 35/023 | 210/348 |
| 3,016,161 A * | 1/1962 | Peplin | B01D 35/023 | 141/382 |
| 3,108,065 A | 10/1963 | McMichael | | |
| 3,322,282 A * | 5/1967 | Lyman | A47L 15/4206 | 134/110 |
| 3,363,771 A | 1/1968 | Walters | | |
| 3,456,799 A * | 7/1969 | Musial | B01D 35/023 | 210/437 |
| 3,570,675 A | 3/1971 | Pall et al. | | |
| 3,770,160 A * | 11/1973 | Flider | B65D 45/06 | 220/318 |
| 3,905,505 A * | 9/1975 | Gallay | B60K 15/077 | 220/563 |
| 3,927,797 A * | 12/1975 | Flider | B65D 1/20 | 220/318 |
| 4,224,167 A * | 9/1980 | Buttigieg | B01D 35/023 | 137/592 |
| 4,259,184 A * | 3/1981 | D'Arnal | A61J 1/05 | 141/329 |
| 4,267,945 A | 5/1981 | Maynard, Jr. | | |
| 4,273,265 A * | 6/1981 | Anderson | B67D 3/044 | 222/189.01 |
| 4,358,372 A | 11/1982 | Lundquist | | |
| 4,489,860 A * | 12/1984 | Flider | B65D 45/025 | 222/189.01 |
| 4,589,895 A * | 5/1986 | Goldner | B01D 46/06 | 55/357 |
| 4,640,771 A * | 2/1987 | Whalen | B01D 29/15 | 210/167.01 |
| 4,650,087 A * | 3/1987 | White | B60K 15/0403 | 220/86.3 |
| 4,675,110 A | 6/1987 | Fay | | |
| 4,743,369 A * | 5/1988 | Geermans | B01D 29/27 | 210/167.29 |
| 4,816,154 A * | 3/1989 | Hartley | B01D 29/27 | 210/448 |
| 4,860,805 A * | 8/1989 | Townsend | A47C 27/085 | 141/286 |
| 4,861,478 A * | 8/1989 | Hall | B01D 29/35 | 210/416.4 |
| 4,908,130 A * | 3/1990 | Lynne | B01D 29/90 | 210/172.6 |
| 5,025,946 A * | 6/1991 | Butkovich | B60K 15/0403 | 220/86.3 |
| 5,312,545 A * | 5/1994 | Starin | B01D 35/027 | 210/172.6 |
| 5,360,040 A * | 11/1994 | Thorn | B60K 15/04 | 141/286 |
| 5,496,523 A * | 3/1996 | Gazit | B01L 3/0275 | 422/513 |
| 5,505,849 A | 4/1996 | Rama, Jr. | | |
| 5,520,802 A * | 5/1996 | Brubaker | B01D 29/35 | 210/172.6 |
| 5,609,760 A | 3/1997 | Leach | | |
| 5,718,281 A * | 2/1998 | Bartalone | F01P 11/029 | 165/119 |
| 5,733,449 A | 3/1998 | Bowers et al. | | |
| 5,935,435 A * | 8/1999 | Hasler | B01D 29/085 | 210/232 |
| 6,200,484 B1 * | 3/2001 | McInnis | E03F 1/00 | 210/164 |
| 6,217,755 B1 | 4/2001 | Stifelman et al. | | |
| 6,858,134 B2 * | 2/2005 | Yates | B01D 29/21 | 210/167.01 |
| 6,936,084 B2 | 8/2005 | Schlensker et al. | | |
| D518,871 S * | 4/2006 | Gillette | D23/209 | |
| 7,186,333 B2 * | 3/2007 | Kluge | E03F 1/00 | 210/164 |
| 7,329,339 B2 | 2/2008 | Kimisawa et al. | | |
| D563,161 S * | 3/2008 | Bodum | D7/399 | |
| D575,105 S * | 8/2008 | Gauss | D7/397 | |
| 7,429,322 B2 * | 9/2008 | Fujita | B01D 17/00 | 210/172.4 |
| 7,837,875 B2 | 11/2010 | Callaert et al. | | |
| D637,698 S * | 5/2011 | Greene | D23/268 | |
| 7,959,799 B2 * | 6/2011 | Happel | B01D 21/0012 | 210/163 |
| 8,029,667 B2 | 10/2011 | Santinon | | |
| 8,137,546 B2 | 3/2012 | Ogose | | |
| 8,182,702 B2 * | 5/2012 | Al-Sannaa | B01D 35/02 | 210/448 |
| 8,202,495 B1 * | 6/2012 | Smith | B01L 3/0275 | 422/500 |
| 8,372,278 B1 | 2/2013 | Nguyen et al. | | |
| 8,414,778 B2 * | 4/2013 | Tajima | B01D 61/145 | 210/103 |
| 8,460,617 B2 * | 6/2013 | Schacher | B01L 3/0275 | 422/524 |
| 8,557,200 B1 * | 10/2013 | Smith | B01L 3/0275 | 422/500 |
| 8,632,676 B2 | 1/2014 | Formica | | |
| 9,248,390 B2 * | 2/2016 | Hudgens | B01D 29/56 | |
| 9,486,725 B2 * | 11/2016 | Ries | B01D 35/0276 | |
| 9,982,418 B2 * | 5/2018 | Bennett | E03B 7/095 | |
| 10,005,009 B2 * | 6/2018 | Qureshi | B01D 35/027 | |
| 10,029,132 B2 * | 7/2018 | Cray | A62C 3/065 | |
| 10,307,625 B2 * | 6/2019 | Cray | A62C 4/00 | |
| 2005/0109685 A1 * | 5/2005 | Fujita | B01D 17/00 | 210/172.2 |
| 2005/0183997 A1 * | 8/2005 | Happel | B01D 21/0012 | 210/163 |

(56) References Cited

U.S. PATENT DOCUMENTS

| | | | |
|---|---|---|---|
| 2010/0028934 A1* | 2/2010 | Schacher | B01L 3/0275 435/29 |
| 2010/0119416 A1* | 5/2010 | Tajima | B01D 15/22 422/400 |
| 2010/0155345 A1* | 6/2010 | Al-Sannaa | B01D 35/02 210/806 |
| 2011/0036763 A1* | 2/2011 | Santinon | B60K 15/04 210/232 |
| 2012/0156114 A1* | 6/2012 | Ziegmann | B01L 3/0275 422/513 |
| 2012/0312759 A1* | 12/2012 | Ries | F02M 37/22 210/806 |
| 2013/0092290 A1* | 4/2013 | Waymire | B60K 15/0403 141/286 |
| 2014/0054236 A1* | 2/2014 | Bennett | E03B 7/095 210/747.3 |
| 2014/0238915 A1* | 8/2014 | McInnis | E03F 5/0404 210/170.03 |
| 2014/0291234 A1 | 10/2014 | Chi et al. | |
| 2015/0190741 A1* | 7/2015 | Washington | B01D 35/005 141/11 |
| 2016/0193553 A1* | 7/2016 | Qureshi | B01D 29/27 210/314 |

OTHER PUBLICATIONS

Miller, C., "The Parameters that Control the Performance of the In-Tank Fuel Strainer", Mar. 2, 1979, 790091, pp. 1-14.

"OEM Parts—Exhaust System, Fuel Supply—106232-0001-H1" http://www.powermowersales.com/pages/oemparts?aribrand=BRG, Accessed Oct. 10, 2014.

International Search Report and Written Opinion Application No. PCT/US2015/039084 dated Sep. 24, 2015.

\* cited by examiner

METHODS, DEVICES, AND SYSTEMS FOR FILTERING HYDROCARBONS

CROSS-REFERENCE

This application claims the benefit of U.S. Provisional Application Ser. No. 61/923,525 filed Jan. 3, 2014, which application is incorporated herein by reference in its entirely and to which the instant application claims priority under 35 USC § 119(e).

BACKGROUND OF THE INVENTION

Gasoline is a petroleum-derived liquid that is used as fuel in internal combustion engines. It is commonly obtained by the fractional distillation of petroleum and typically contains mostly organic compounds. Gasoline is typically enhanced with a variety of additives but also contains impurities, particulates, and contaminates.

SUMMARY OF THE INVENTION

Fuel delivery systems contain highly sensitive components. Modern consumer vehicles are equipped with a rather uniform fuel system in which many of these critical components are susceptible to fuel impurities, containments, particulates, and the like. In fact, one of the leading causes of fuel system failures in vehicles is due to particulates in fuel which cause substantial harm to the operation and results in inefficient performance of vehicles. Most vehicle owners have heard of the "quarter-tank syndrome" in which it is recommended that you not run your vehicle with a quarter-tank or less of fuel. Why is this? The answer mostly lies in the build-up of impurities, contaminates, particulates, and the like in the fuel system. These small particles mix with the fuel during production, transportation, and during introduction into the fuel system (e.g., initially in the vehicle tank) ending up in the internal vehicle fuel system causing substantial damage to the vehicle during operation.

Countries, including the U.S., currently regulate the fuel system process, including at the pump; however, existing systems are not effective in preventing particulates from entering the fuel system. In addition, "in-line" filtering within a vehicle requires mechanical maintenance, and significant time, money, and energy to ordinary consumers and commercial fleet managers alike.

The subject matter described herein provides a solution to several problems caused by impurities, containments, particulates in gasoline fueled systems, including specifically damage to the following components within a vehicle fuel system:

Fuel Pump. Particulates that are pumped into the tank during fueling are pulled up into the fuel filter. Over time, the particulates begin to block the flow of fuel into the pump. The more particulate matter that accumulates, the less efficient the vehicle fuel pump can operate. Eventually, the fuel pump will labor and burn out over time requiring premature replacement.

Standard Fuel Line and Fuel Injectors. Particulates that make it through the fuel pump are pushed through the fuel lines and into the "in-line" fuel filter of the system. The "in-line" fuel filter serves as a last defense against particulate matter before more sensitive components of the fuel system. Clogged, or even partially blocked, "in-line" fuel filters will not function properly and will allow particulates to pass through, thus causing very poor drivability, reduced mileage per gallon, and increased emissions. Once the particulate matter passes through the fuel lines, the particulate matter is moved along to the fuel rail, pressure regulator, and injectors (one per cylinder). The impurities cause the regulator to malfunction as well as clogging up of the needle point openings on the injectors, which typically leads to a lean burn caused by improper fuel to oxygen ratios in the combustion process (too much air and not enough fuel). In these situations, the fuel injector must be replaced.

Standard Exhaust System. The exhaust system of a typical vehicle houses one or more oxygen sensors (including but not limited to four oxygen sensors) which measures the oxygen as it passes out of the vehicle. A lean burn (mentioned above) is detected by these sensors and will prompt the onboard computer to turn on the dreaded "Service/Check Engine" light to illuminate. Extended driving under these conditions will cause the oxygen sensors to burn out, requiring replacement. In addition, because of the excessive heat generated by a lean burn, the inner element of the catalytic converter will melt and can break into pieces. Those pieces are then passed into the muffler, causing damage, requiring replacement of the catalytic converter, muffler, and potential other exhaust system components.

The methods, devices, and systems described herein provide for the reduction and/or prevention of impurities, containments, and other particulates from entering the fuel system before they are introduced to the vehicle, for example with the use of filtering apparatuses, methods, and devices for consumers, business owners, and commercial fleet managers alike. A feature of the subject matter described herein is a device that is inserted into the fuel inlet (where fuel is pumped into the vehicle's fuel tank). In some embodiments, provided is a fuel screen or filter that has been engineered to meet or exceed evap and/or auto shutoff valve specifications. In practice, once the filter is securely in place, the user adds fuel as they normally would into the vehicle. In certain applications, the screen or filter uses a fine micron filtration.

The methods, devices, and systems described herein provide an effective and convenient improvement in the maintenance of a vehicle's performance using pre-tank filters. The subject matter designed herein is engineered to meet and exceed the needs and requirements set forth by vehicle manufacturers and governmental agencies. For example, in one embodiment, the methods, devices, and systems described herein provide an insert into a vehicle's gas inlet which extends the life of the fuel system through effective and simple pre-screening of fuel.

A feature of the subject matter described herein is to provide increased commercial and consumer vehicle preventative fuel system care using a fuel screen or filter that, in some embodiments, is not incorporated into the permanent componentry of a vehicle. For example, in some embodiments, the fuel screen filter is removable. Some advantages of the methods, devices, and systems described herein include an extension of a vehicle's lifespan in operation, a reduction in maintenance time (and associated time, energy, and cost), a decrease in fuel delivery replacement part purchases, and cleaner burning fuel systems that are more environmentally friendly (e.g., less pollution). In addition, the subject matter described herein provides a reduction in fuel expenditures by increasing the miles per gallon of a vehicle, and enhancing the drivability of the vehicle. In addition, direct savings on replacement parts will are realized with application of the methods, devices, and systems described herein, in areas such as fuel pumps, fuel filters, injectors, oxygen sensors, and catalytic converters. Another advantage of the subject matter provided herein is quick installation, removal, and replacement by the operator with no specialty tools required.

DETAILED DESCRIPTION OF THE INVENTION

Figure 1:
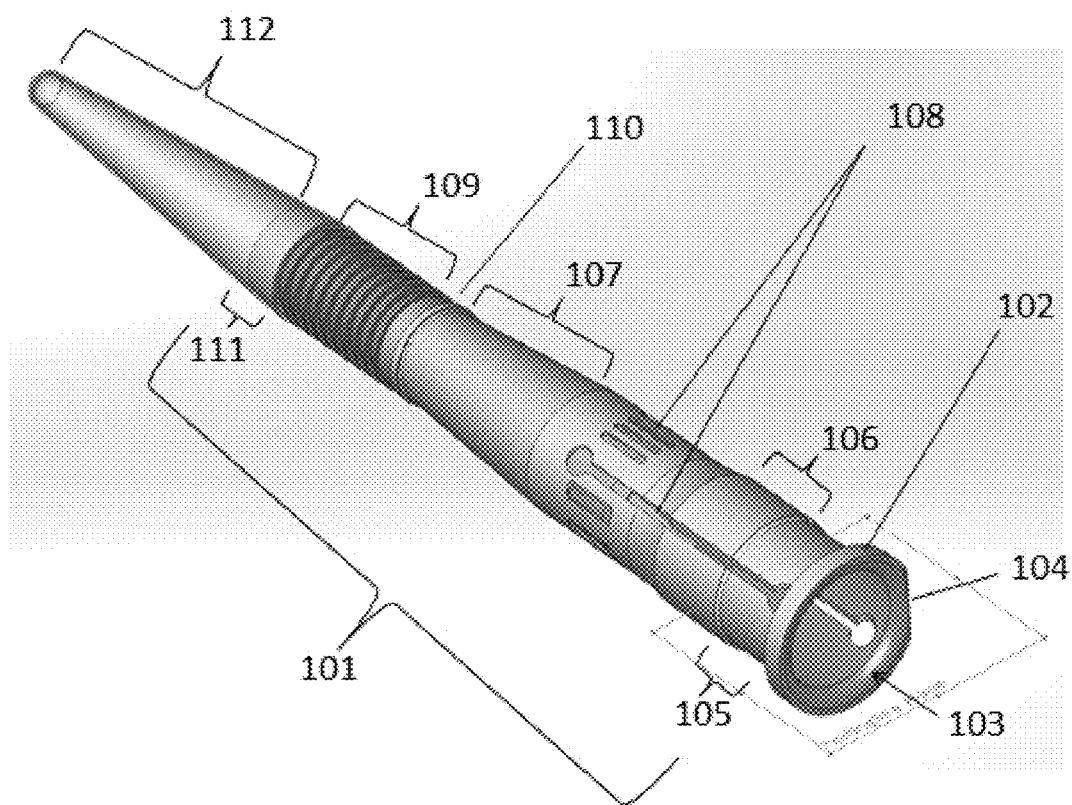
FIG. 1 is an illustration of one embodiment of invention as showing element 101, an elongated tube, 102 a ridge at the top of the elongated tube, 103 an inward funnel shape of the inside diameter of the top of the tube, 104 a notch in the outside circumference of the ridge outside diameter, 105 a recess in the outside diameter of the elongated tube, 106 a collar on the elongated tube, 107 a narrowing of the elongated tube, 108 vents, 109 barbed teeth, 110 a ridge creating a hard stop, 111 the bonding surface for the filter, and 112 a mesh filter.
Figure 2:
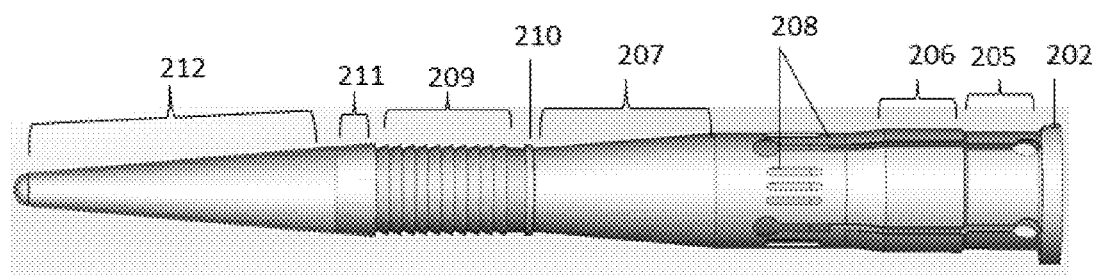
FIG. 2 is a perspective view illustrating one embodiment of the invention showing element, 202 a ridge a top the elongated tube, 205 a recess along the outside surface of the elongated tube, 206 the collar on the outside surface of the elongated tube, 207 a narrowing in the elongated tube, 208 vents in the elongated tube, 209 barbed teeth, 210 a ridge that forms a hard stop, 211 a bonding surface, and 212 a mesh filter.
Figure 3:
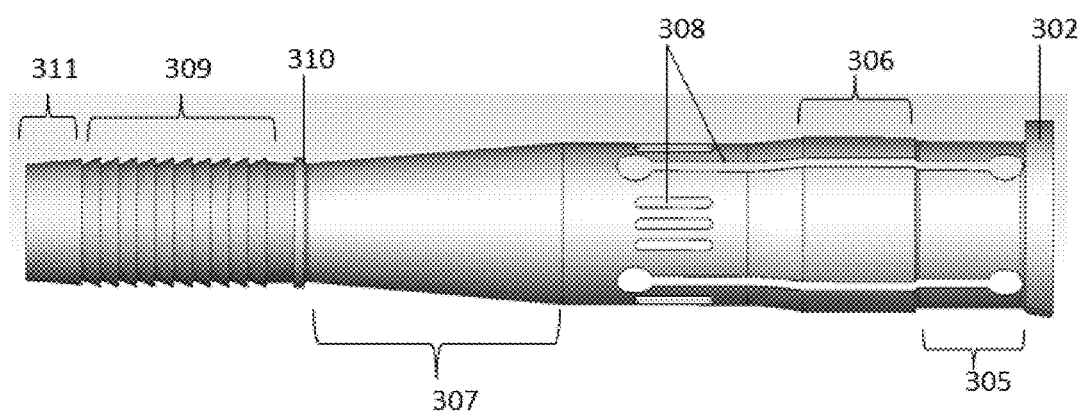
FIG. 3 is a perspective view illustrating the elongated filter body elements of one embodiment of the invention, 302 a ridge on the top end of the elongated tube, 305 a recess along the outside surface of the elongated tube, 306 a collar on the outside of diameter of the elongated tube, 307 a narrowing of the elongated tube, 308 vents, 309 barbed teeth, 310 a ridge that forms a hard stop, and 311 a bonding surface.
Figure 4:
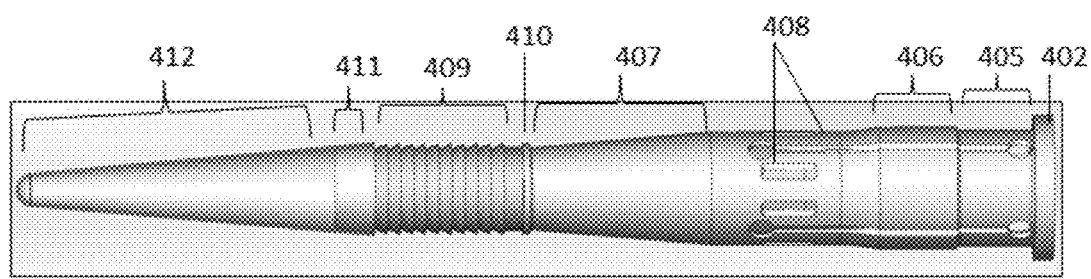
FIG. 4 is a perspective view illustrating one embodiment of the invention showing element, 402 a ridge a top the elongated tube, 405 a recess in the outside surface of the elongated tube, 406 a collar on the outside surface, 407 the narrowing of the elongated tube, 408 vents in the elongated tube, 409 barbed teeth, 410 a ridge that forms a hard stop, 411 a bonding surface, and 412 a filter (e.g., a mesh filter).
Figure 5:
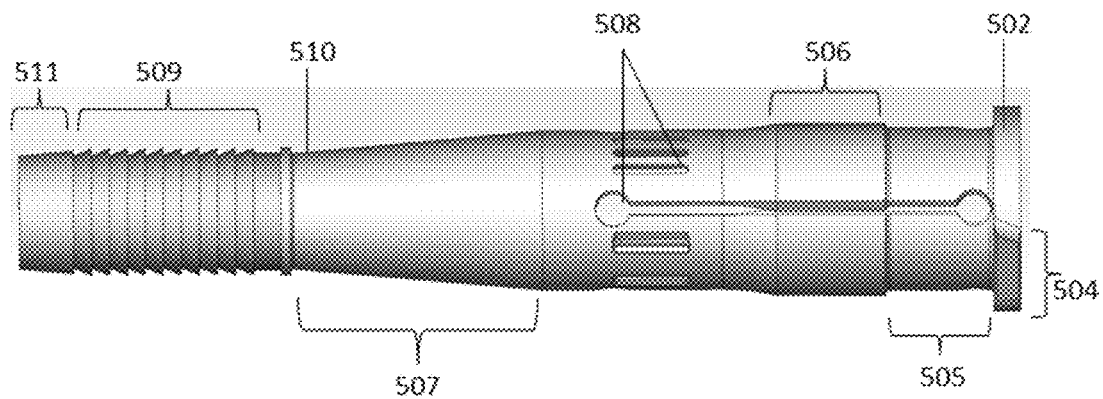
FIG. 5 is a perspective view of the elongated filter body illustrating elements of one embodiment of the invention, 502 a ridge on the top end of the elongated tube, 504 an optional notch in the outside circumference of the ridge a 505 a recess in the outside surface of the elongated tube, 506 a collar along the outside surface of the elongated tube, 507 a narrowing in the diameter of the elongated tube, 508 vents, 509 barbed teeth, 510 a ridge that forms a hard stop, and 511 a bonding surface.
Figure 6:
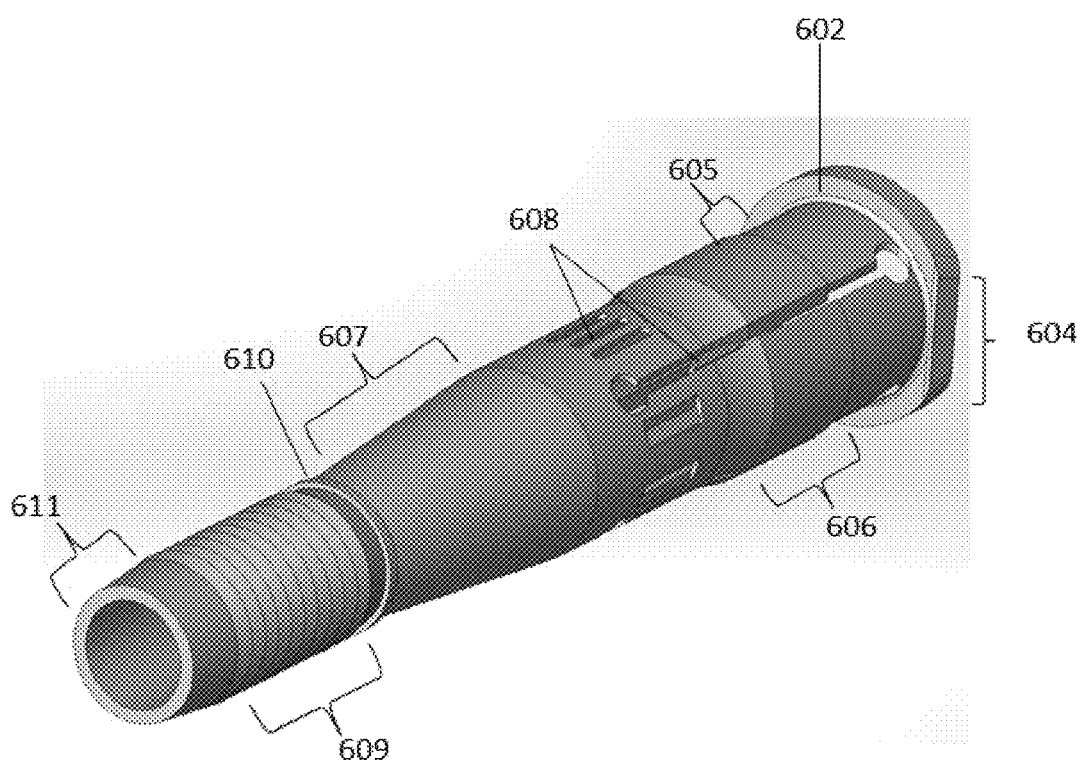
FIG. 6 is a ¾ view looking up the elongated body of the filter illustrating one embodiment of the invention with elements 602 the ridge on top end of the elongated tube, 604 a notch in the ridge on the outside surface, 605 a recess in the outside diameter of the elongated tube, 606 a collar on the outside of surface, 607 a narrowing in the diameter of the elongated tube, 608 vents, 609 barbed teeth, 610 a ridge that forms a hard stop, and 611 a bonding surface.
Figure 7:
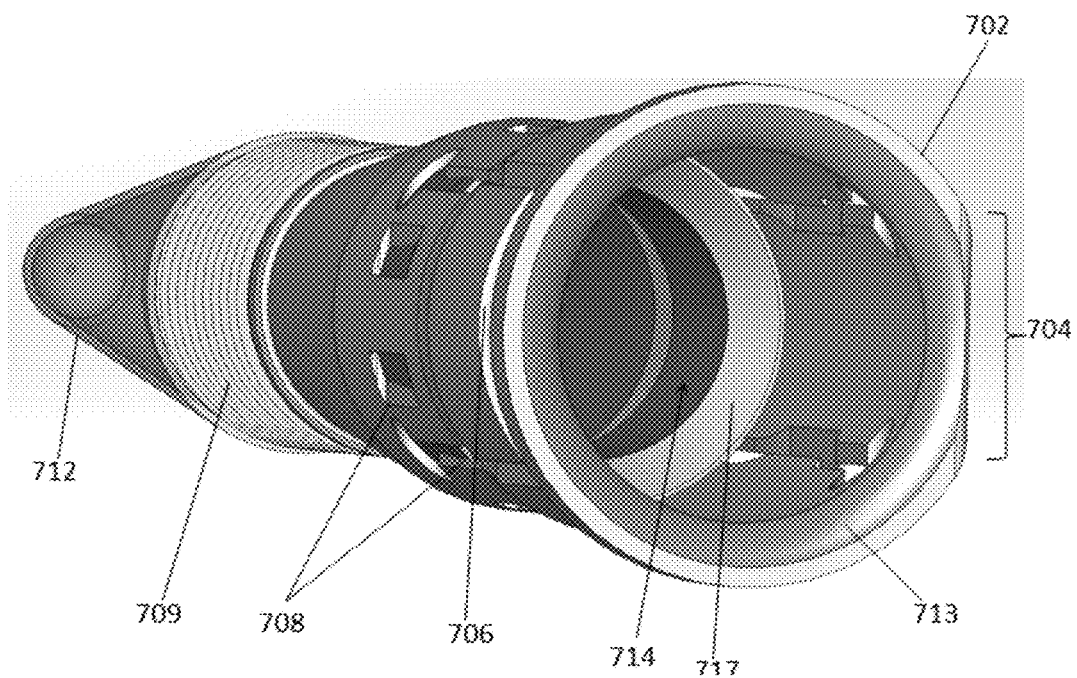
FIG. 7 is a ¾ view looking down the elongated body of the filter with the optional seal in illustrating one embodiment of the invention with elements 702 the ridge on top end of the elongated tube, 704 an optional notch in the outside circumference of the ridge, 705 a recess in the outside surface of the elongated tube, 706 a collar on the outside of the surface, 707 a narrowing in the diameter of the elongated tube, 708 vents, 709 barbed teeth, 712 mesh filter, 713 an inward funnel of the top ridge, 714 an optional seal, and 717 seals on the angular inner surface of the elongated tube.
Figure 8:
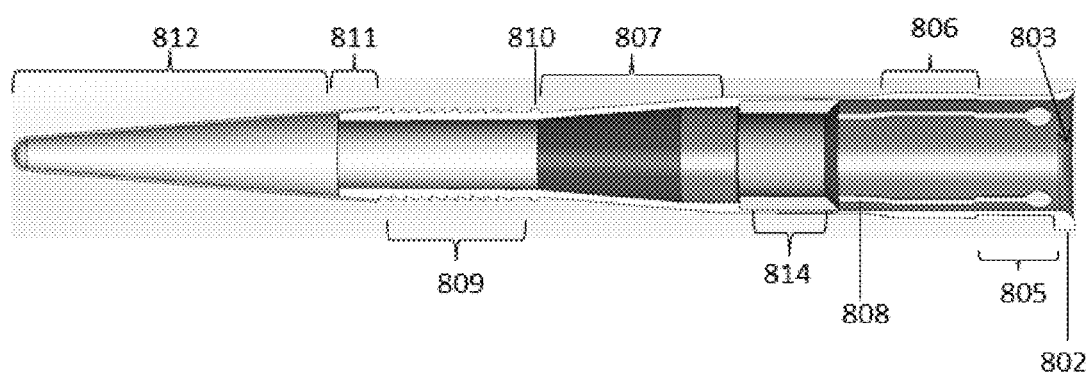
FIG. 8 is a perspective cross-sectional view illustrating one embodiment of the invention showing element, 802 a ridge a top the elongated tube, 803 an inward funnel shape of the inside surface of the top of the tube, 805 a recess in the outside surface of the elongated tube, 806 a collar on the outside surface, 807 a narrowing in the elongated tube, 808 vents in the elongated tube, 809 barbed teeth, 810 a ridge that forms a hard stop, 811 a bonding surface, 812 a mesh filter, and 814 an optional seal.
Figure 9:
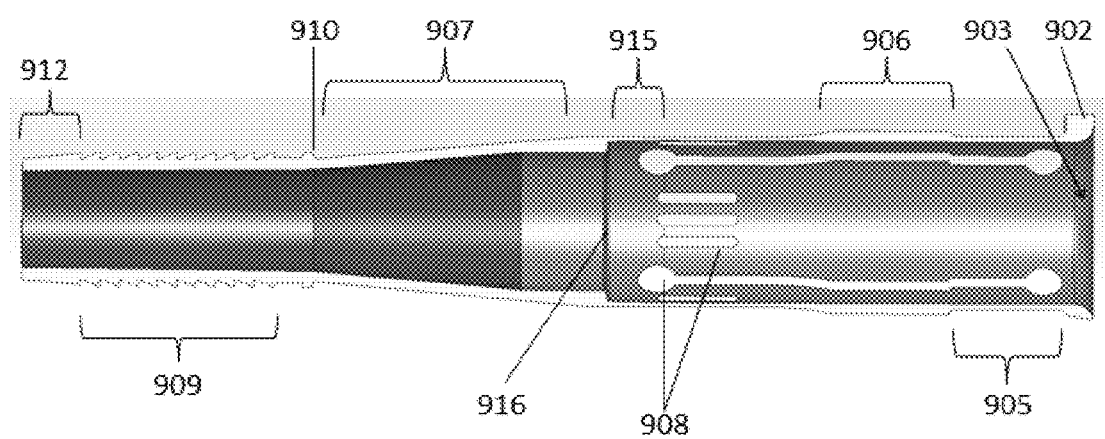
FIG. 9 is a perspective cross-sectional view of the elongated filter body illustrating elements of one embodiment of the invention, 902 a ridge on the top end of the elongated tube, 903 a top end of the elongated tube, 904 an optional notch in the outside circumference of the ridge, 905 a recess in the outside diameter of the elongated tube, 906 a collar on the outside of surface of the elongated tube, 907 a narrowing in the diameter of the elongated tube, 908 vents, 909 barbed teeth, 910 a ridge that forms a hard stop, 911 a bonding surface, and 912 a bottom end, 915 a shoulder on the top end of the elongated tube, and 916 an outside diameter of the shoulder of the top end of the elongated tube.
Figure 10:
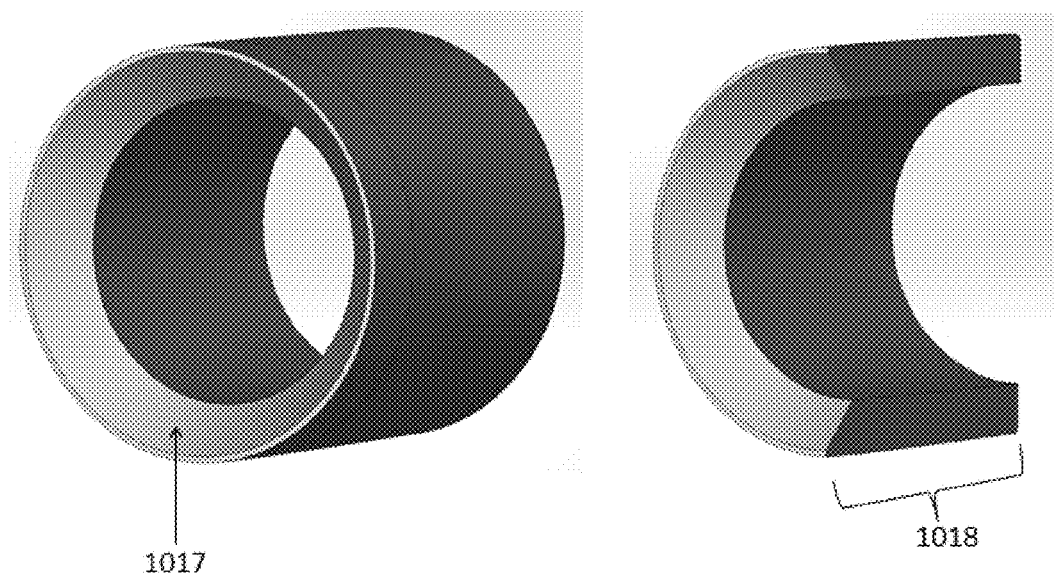
FIG. 10 is a ¾ view and a ¾ cross-sectional view of the optional seal, 1018 is a cut away showing the length and thickness of one embodiment of a seal, and 1017 illustrates an inward funnel shape of the top end of a seal.
Figure 11:
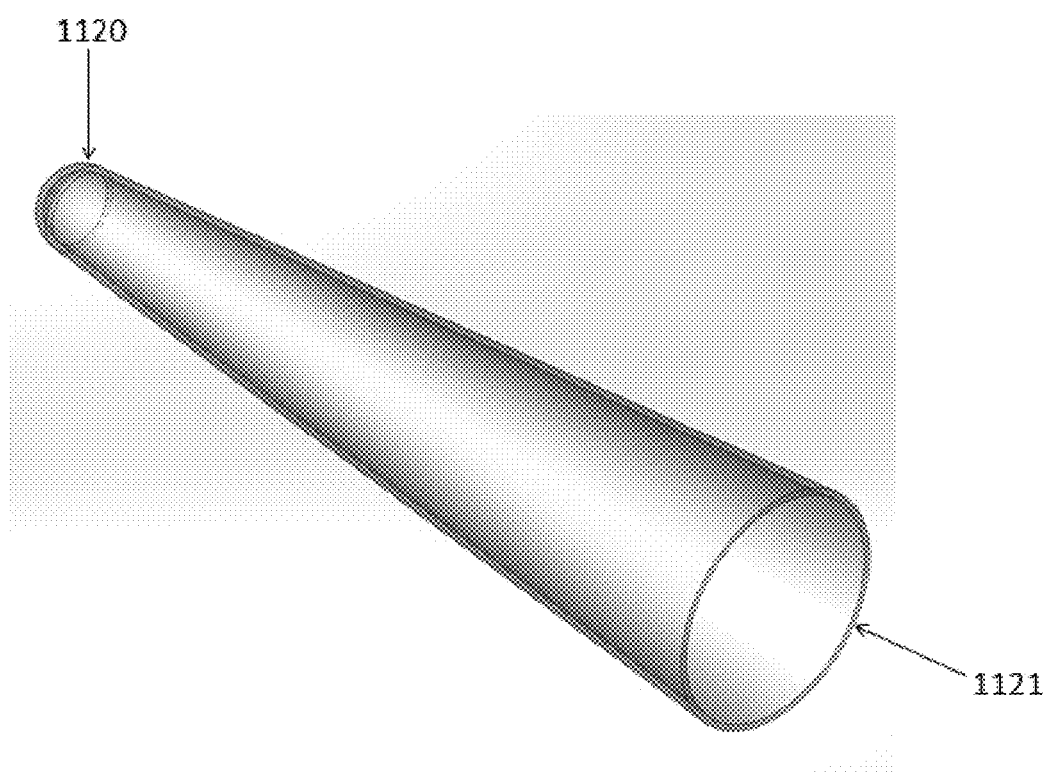
FIG. 11 is a ¾ cross section illustrating one embodiment of the mesh filter, 1120 is a closed bottom end, and 1121 is an open top end.
Figure 12:
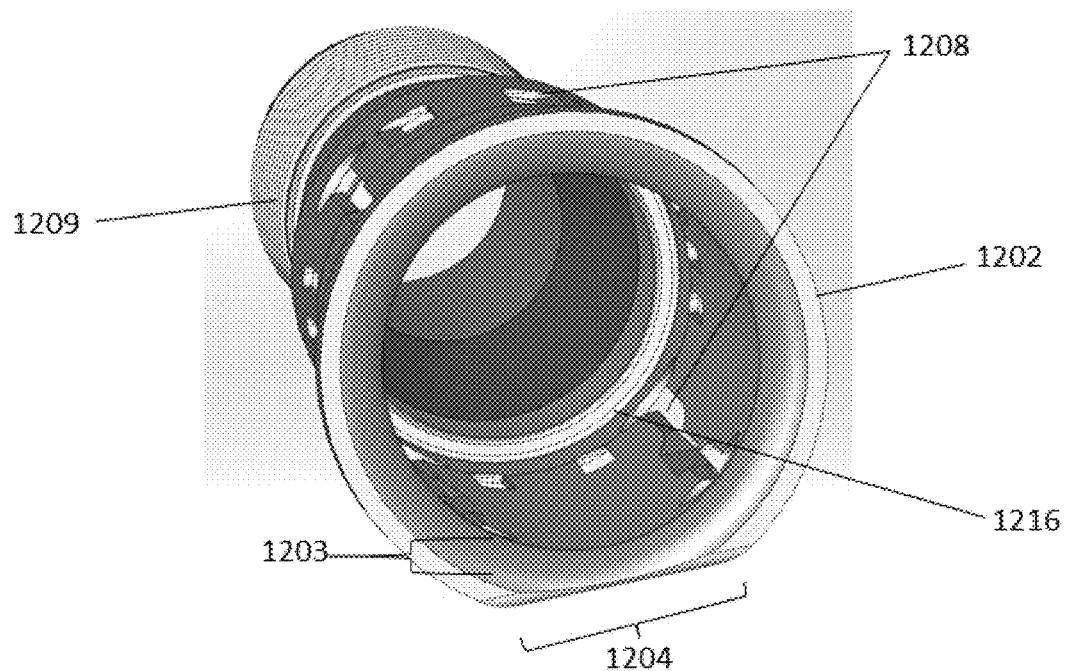
FIG. 12 is a ¾ view looking down into the negative space of the inside diameter of the elongated tube and is illustrative of one embodiment of the invention revealing elements 1202 a ridge on top of the elongated tube, 1203 an inward funnel shape of the inside surface of the top of the tube, 1204 an optional notch in the outside circumference of the ridge of the elongated tube, 1208 vents, 1209 barbed teeth, and 1216 a hard stop for the optional seal.
Figure 13:
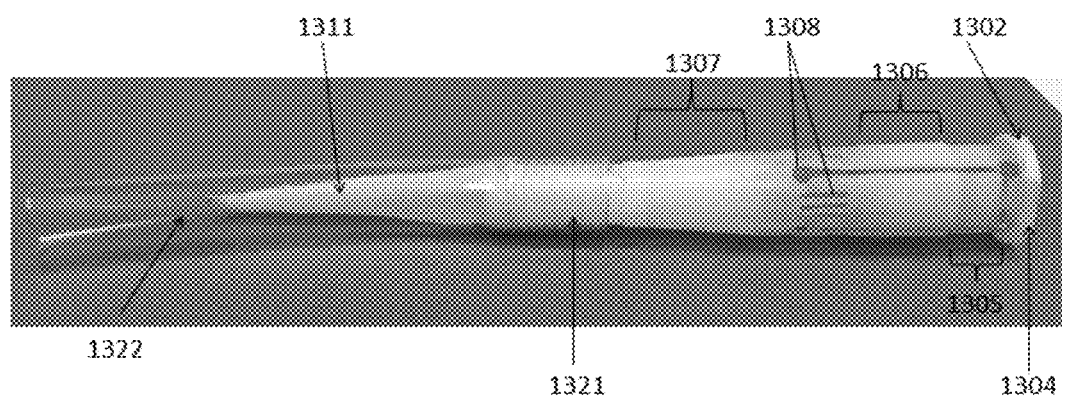
FIG. 13 is an perspective image illustrating elements 1302, a ridge on top of the elongated tube, 1304 an optional notch in the outside circumference of the ridge outside diameter, 1305 a recess in the outside surface of the elongated tube, 1306 a collar on the outside of the surface, 1307 a narrowing in the diameter of the elongated tube, 1308 vents, 1311 a bonding surface, 1321 a flexible hose affixed up over the barbed teeth, and 1322 a flexible hose holding the mesh filter to the elongated body.
Figure 14:
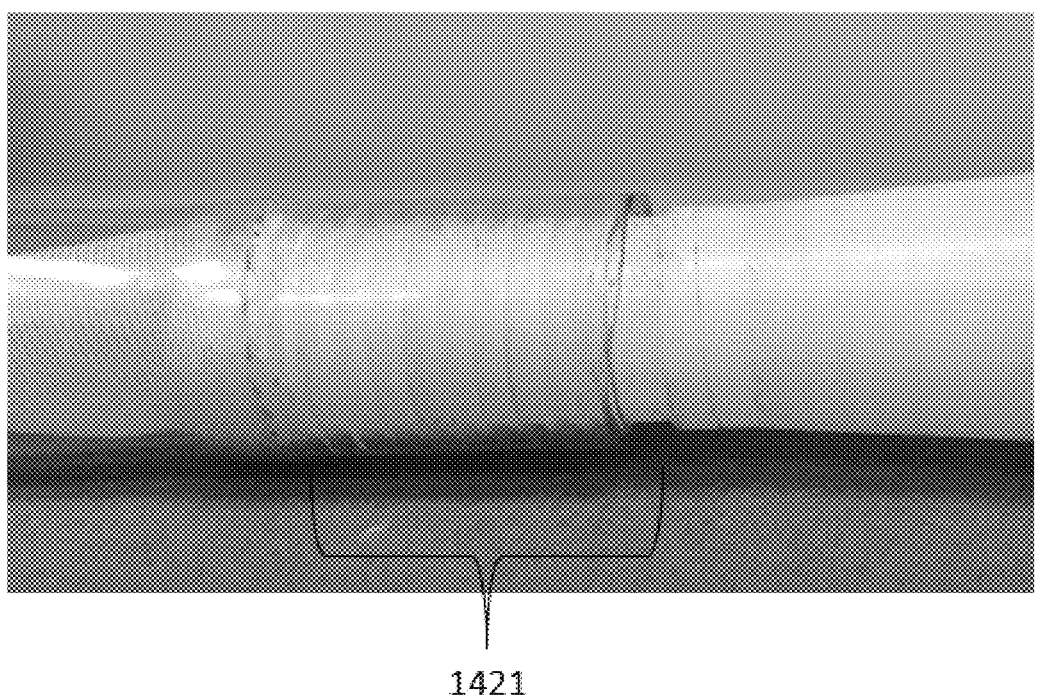
FIG. 14 is an up close image of a hose affixed over the barbed teeth and holding the mesh filter to the elongated tube 1421.

As discussed herein, the inventor has identified significant problems in the field of vehicle care caused by the contamination of liquid hydrocarbon fuels. During the refining and transportation process of gasoline, for example, fine particulates and contaminates are introduced to the liquid hydrocarbon fuel. These particulates and contaminates enter the vehicles fuel system during regular refueling. The continued introduction of the particulates and contaminates causes a build-up in the fuel tank, leading to clogging and deterioration of the vehicle's engine and fuel system.

Evidence of this build-up is witnessed in the vehicle fuel system failures resulting from contaminated fuel. Over time particulates and contaminates accumulate at the bottom of the fuel tank where the in-tank pre-fuel pump filter is located, creating a restriction in the flow of fuel to the fuel pump. This restriction in fuel flow leads to the fuel pump having to over work causing a strain on the fuel pump which in turn creates low fuel pressure in the fuel system. This strain of the fuel pump causes premature pump failure leading to expensive repairs. The low fuel system pressure causes a cascade of events the results in a lean fuel mixture and poor engine performance. Lean fuel mixtures lead to reduced power generated from the internal combustion engine, causing poor fuel economy and reduced power. A lean burning internal combustion engine also generates excessive heat causing failure of critical components and costly repairs. Another problem created by the accumulation of particulates and contaminates is the eventual break down of the in-tank filter allowing the exposure of the particulates to sensitive internal engine components. This exposure leads to failure, breakdown and once again costly repairs. These component failures and costly repairs can be avoided with the proper pre-tank filtration of the gasoline.

Filters

Another feature is a filter, which restricts, sieves, impedes, blocks, screens, and/or captures particles and contaminates as they are being dispensed from a fuel dispensing nozzle into a fuel tank of a vehicle. Filters for the filtration of a liquid hydrocarbon or other suitable liquid, for example, as the liquid hydrocarbon is being dispensed are described herein. The filters provided herein provide a cost effective method for the removal of the particulates and contaminates contained in a liquid hydrocarbon prior to the liquid hydrocarbons entry into a vehicles fuel tank.

In some embodiments, the filters are removable from the inlet of a fuel tank after fueling is complete. In further or additional embodiments, the filter is designed to be permanent or semi-permanent within the inlet of the fuel tank.

As shown in the Figures, in some embodiments, the filter has an elongated tube body that is constructed from materials suitable for creation of a semi-rigid or rigid body. A feature of the subject matter described herein are methods, devices, and systems comprising a pre-tank filter that removes particulates and contaminates from a liquid hydrocarbon fuel prior to entering the vehicle fuel tank. The present invention involves a liquid hydrocarbon fuel filtration system that prevents particulates and contaminates from entering the vehicle fuel tank by filtering the fuel as it is being dispensed into the vehicle. In some embodiments the filter has an elongated tube with a top end and a bottom end wherein the bottom end has a mesh filter attached by a suitable means. In some embodiments the elongated tube and the mesh filter are combined to form a unitary construction. In some embodiments, the elongated tube and the mesh filter are separate components.

For example, in some embodiments, provided is a filter comprising an elongated tube having a top end and a bottom end and a liquid hydrocarbon filter. In further or additional embodiments, the filter is attached to the bottom end or the top end of the elongated tube. In some embodiments, provided is an elongated tube and a filter that comprises a unitary construction. In some embodiments, provided is an elongated tube that comprises a separate component from the filter element. In still further or additional embodiments, provided is an elongated tube that comprises a thermoplastic material. A thermoplastic, or thermosoftening plastic, is a plastic material, typically a polymer, that becomes pliable or moldable above a specific temperature and solidifies upon cooling. In further or additional embodiments, provided is an elongated tube that comprises a material suitable for passage of a liquid hydrocarbon.

Elongated Tube

Another feature of the subject matter described herein are methods, devices, and systems comprising an elongated tube that is designed to facilitate insertion and removal of the elongated tube into an inlet of a fuel tank of a vehicle. This feature provides, in certain applications, a rigid structure for the attachment of the filter and the proper retention in the fuel vehicle neck.

For example, in some embodiments, the elongated tube is from about 0.3 inches to about 1.6 inches. In some embodiments, the outside diameter of the top end of the elongated tube is from about 0.7 inches to about 1.6 inches. In certain embodiments, the outside diameter of the elongated tube is about 0.1 inches to about 2 inches immediately below a shoulder of a ridge.

In further or additional embodiments, the outside diameter of the bottom end of the elongated tube is from about 0.4 inches and about 0.7 inches. In still further or additional embodiments, the outside diameter of the bottom end of the elongated tube is about 0.6 inches. In certain embodiments, an inside diameter of the elongated tube is from about 0.25 inches to about 0.9 inches. In still further or additional embodiments, an inside diameter of the top end of the elongated tube is from about 0.65 inches to about 0.9 inches. In some embodiments, the inside diameter at the bottom end of the elongated tube is from about 0.4 inches to about 0.6 inches. In further or additional embodiments, an outside diameter immediately below a shoulder of a ridge located on the top of the elongated tube is from about 0.03 inches to about 0.06 inches creating an indentation in the outside diameter.

In some embodiments, a collar is formed on the elongated tube. The purpose of the collar on the elongated tube, in certain applications, is to facilitate the proper seating and securing of the filter assembly into the fuel filler neck of a vehicle. In some embodiments, the collar is from about 0.25 inches to about 1 inch from an end of the elongated tube. In certain embodiments, a collar is located at least 0.5 inches below the top end of the elongated tube.

Ridge on Elongated Tube

Another feature of the subject matter described herein are methods, devices, and systems comprising a filter, provided that the top end of the filter has a ridge that is designed to facilitate insertion of the elongated tube into a fuel tank of a vehicle. The purpose of the ridge on the elongated tube, in certain embodiments, is to prevent the filter assembly from insertion past the fuel neck filler door and becoming lodged in and creating a blockage within the fuel tank filler neck and system.

In some embodiments, the ridge optionally comprises a shoulder. In some embodiments, the ridge comprises an elevated or greater outside diameter compared to the remaining portion of the elongated tube. In some embodiments, provided is a filter comprising a ridge that has an outside diameter from about 0.5 inches to about 1.5 inches. In some embodiments, the outside diameter is from about 0.9 inches to about 1.2 inches. In still further or additional embodiments, the ridge has an outside diameter that is about 1 inch, or about 1.1 inches.

In some embodiments, the ridge has a shoulder that comprises a length from about 0.01 inches to about 1 inch, or from about 0.05 inches to about 0.3 inches. In further or additional embodiments, the ridge has a shoulder that comprises a length of about 0.1 inches to about 0.2 inches. In further or additional embodiments, provided is a ridge that has atop end that comprises a funnel shape extending downward. For example, in some embodiments, the funnel shape extends downward from about 0.05 inches to about 0.3 inches. In still further or additional embodiments, the funnel shape extends downward for at least about 0.1 inches. In still further or additional embodiments, the funnel shape further comprises an angle of about 30 degrees to about 60 degrees. In certain embodiments, provided is a ridge that comprises a circular shape. In some embodiments, provided is a ridge that has a notched out section that comprises a flat surface.

Narrowing of the Elongated Tube

Another feature of the subject matter described herein are methods, devices, and systems comprising elongated tube that narrows from the top end to the bottom end, which facilitates insertion and removal into an inlet of a fuel tank of a vehicle. Application of this feature, in certain aspects, creates a proper seal with the fuel dispensing nozzle. This seal is desirable for the proper function of the fuel dispensing nozzle's automatic shut off valve of a fuel pump.

In some embodiments, the elongated tube has an outside diameter of the top end that is reduced by from about 0.3 inches to about 0.65 inches compared to an outside diameter of the bottom end. In certain embodiments, the elongated tube comprises about a 3 degree to about a 10 degree narrowing. In further or additional embodiments, the narrowing reduces the inside diameter by about 0.1 inches to about 0.5 inches, or from about 0.18 inches to about 0.28 inches. In some embodiments, the narrowing is about 5 degrees.

In certain embodiments, provided is an elongated tube that comprises a space created by the removal of material from the inside surface wall of the elongated tube creating a race for a seal to be inserted into. In further or additional embodiments, the race for the seal has a top end and a bottom end. In still further embodiments, the seal race further comprises a hard stop for the seal.

Vents in the Elongated Tube

Yet another feature of the methods, devices, systems described herein is a filter comprising an elongated tube that further comprises a vent slot in the elongated tube that is designed to align with a hose. This feature, in certain applications, provides two distinct advantages. First, the vents in the elongated tube allow for the proper displacement of the liquid hydrocarbon vapors when fuel is added into the fuel tank. Second, the vents in the elongated tube allow the temporary compression of the rigid body of the elongated tube during the process of insertion into the filler neck door of the fuel tank.

In some embodiments, provided is a vent slot that is cut along the longitudinal axis of the elongated tube. In certain embodiments, the vent slot is along the vertical axis of the elongated tube. In further or additional embodiments, provided is a vent slot that is diagonal with respect to the horizontal and/or vertical axis of the elongated tube.

In some embodiments, the elongated tube comprises at least one long vent slot and at least a short vent slot. In further or additional embodiments, at least one vent slot is from about 0.2 inches and about 2.5 inches. In still further or additional embodiments, the width of the vent slots is at least about 0.03 inches. In some embodiments, at least one of the vent slots starts about 0.2 inches down from the top of the elongated tube. In yet an additional embodiments, provided are 2.5 times greater number of short vent slots compared with the number of long vent slots. In some embodiments, provided are 4 longer vent slots and 10 shorter vent slots. In still further or additional embodiments, provided is a longer vent slot that is spaced substantially equidistant around the outside surface of the elongated tube. Still further, provided in certain applications are shorter vent slots that are grouped 3 by 2 and are dispersed in a space substantially between the longer vent slots.

Barbed Teeth

Another feature of the subject matter described herein is an elongated tube comprising barbed teeth. This feature provides a mechanism to attach and restrain a hose onto the elongated tube. When applied, friction is created when the hose is forced up and over the barbed teeth of the elongated tube. The friction that is created via the attachment of the hose can also be used to retain the mesh filter to the elongated tube portion of the filter.

With respect to the hose, the addition of a hose, in certain embodiments, to the bottom end of the filter assembly serves multiple purposes. One purpose of the hose is to create a smooth flow of the fuel and prevent the fuel from splashing back, thus preventing an inadvertent triggering of the fuel dispensing nozzles automatic shutoff valve. Another purpose of the hose is to protect the mesh filter body during the insertion process of the filter assembly into a vehicles fuel filler neck. Yet another further purpose of the hose in some embodiments is for the retention of the mesh filter to the elongated tube.

In certain embodiments, the barbed teeth begin from about 0.5 inches to about 10 inches down from the top of the elongated tube. In some embodiments, the barbed teeth begin from about 3.5 inches to about 4.5 inches from the top of the elongated tube. In still further or additional embodiments, barbed teeth begin about 4 inches down from the top of the elongated tube, or from about 0.5 inches to about 2 inches.

In certain embodiments, just prior to the barbed teeth, a ridge is located by the outside diameter perturbing sharply outward forming a hard stop above the barbed teeth. In still further or additional embodiments, a hose is affixed over the barbed teeth. For example, in certain applications, the hose comprises suitable material for use in passing a liquid hydrocarbon fuel through the hose. In some embodiments, the hose comprises a flexible material.

Bonding Surface

Another feature of the subject matter described herein is an elongated tube comprising a bonding surface on the bottom end of the elongated tube. This feature provides a surface area sufficient to attach a filter using a suitable attachment material, such as an epoxy, as one example or by use of friction that is created by the attachment of the hose as another example.

In some embodiments, the bonding surface extends above the elongated tube for at least about 0.3 inches. In further or additional embodiments, the bonding surface comprises an outside diameter that is reduced from the top end to the bottom end. In certain embodiments, the bonding surface comprises an outside diameter that is reduced by at least about 2 degrees to about 8 degrees, or comprises an outside diameter that is reduced by about 5 degrees. In some embodiments, the bonding surface comprises a suitable polymer, including for example a polyoxymethylene polymer.

Mesh Liquid Hydrocarbon Filter

Another feature of the subject matter described herein is an elongated tube comprising a mesh liquid hydrocarbon filter that comprises a suitable material for screening impurities, particulates, or contaminates in hydrocarbon fuel. In some embodiments, the mesh liquid filter comprises nylon. In further or additional embodiments, the mesh liquid hydrocarbon filter comprises a top end and a bottom end, and the top end of the filter is attached to a bonding surface of the elongated tube. In certain embodiments, the mesh liquid hydrocarbon filter is attached to the elongated tube with a suitable epoxy. In certain embodiments, the mesh liquid hydrocarbon filter is attached to the elongated tube with a string. In some embodiments, the mesh liquid hydrocarbon filter is attached to the elongated tube by friction created when a hose is affixed over barbed teeth.

In some embodiments, the bottom end of the mesh liquid hydrocarbon filter is round, or is square, or is a cylindrical shape, or is a wedge shape, or is a suitable geometric shape. In certain embodiments, provided is a mesh liquid hydrocarbon filter that comprises a pore size from about 80 microns to about 120 microns. In some embodiments, the pore size is at least about 20 microns, at least about 40 microns, at least about 60 microns, at least about 80 microns, at least about 100 microns, at least about 120 microns, or at least about 150 microns. In further embodiments, the mesh liquid hydrocarbon filter comprises a pore size of about 100 microns. In some embodiments, the mesh liquid hydrocarbon filter comprises a surface area from 1,200 square millimeters to about 2,400 square millimeters.

Seal

Another feature of the subject matter described herein is an elongated tube comprising a seal inserted at least substantially into the elongated tube that is designed to limit the extent by which a gasoline nozzle can be inserted into the filter when the filter is inserted into the inlet of a fuel tank of a vehicle. This feature allows the filter assembly to work with the fuel vapor evaporation system required on all fuel dispensing nozzles in California. The seal works by reducing the distance that the fuel dispensing nozzle is allowed to enter into the filter assembly and creating the proper seal to facilitate the proper function of the fuel dispensing automatic shut off valve at a gasoline pump.

In some embodiments, the seal is comprised of flexible material. In certain embodiments, the seal has a top end and a bottom end. In some embodiments, the top end of the seal has an inward funnel shape, proceeding in a downward trajectory for a distance about 0.1 to about 2 inches, or is about 0.3-0.7 inches.

In further or additional embodiments, an inward funnel shape of the top end of the seal has an angle from about 25 degrees and about 70 degrees. In further or additional embodiments, the angle of the inward funnel shape of the seal continues downward for at least 0.05 inches. In further or additional embodiments, the seal has an inside diameter from about 0.4 inches and about 0.7 inches. In certain embodiments, the seal has an outside diameter from about 0.7 inches to about 0.95 inches. In still further or additional embodiments, the seal has a length from the seal top end to the seal bottom end from about 0.5 inches to 2 inches. In some embodiments, seal has a length from the seal top end to the seal bottom end that is about 0.75 inches. In certain embodiments, the seal decreases the distance that a fuel dispensing nozzle can be inserted into the elongated tube. In some embodiments, the seal is affixed to the inside diameter of the elongated tube.

Methods of Screening Fuel

Yet another feature of the subject matter described herein is a method for filtering a liquid hydrocarbon comprising the steps of: (a) inserting a filter (including but not limited to all embodiments and combinations of embodiments of the filters described herein) into the fuel inlet neck of a fuel tank of a vehicle; (b) dispensing liquid hydrocarbons into the inserted filter; and (c) screening the hydrocarbons with the filter to remove impurities, particulates, or contaminates. In some embodiments, for example, fuel is discharged through a fuel discharging nozzle through the filter and into the fuel tank of a vehicle. In some embodiments, the filtering apparatus has a rigid or semi-rigid body and a mesh filter element.

Another feature of the subject matter provided herein is the application of the fuel screening methods, devices, and systems to a wide range of fuel powered entities. In some embodiments, the entity is a gasoline-powered vehicle. For example, in some embodiments, vehicle is an automobile, a marine vessel, an airplane, a truck (including but not limited to a commercial truck), an off road recreational vehicle, construction equipment, a lawn mower, a motorcycle, a recreational vehicle.

Yet another feature of the subject matter described herein is the wide use of liquids that can be screened with the methods, devices, and systems described herein. For example, in some embodiments, the liquid is a hydrocarbon. For example, the hydrocarbon is gasoline. In other embodiments, the liquid is diesel fuel. In further or additional embodiments, liquid hydrocarbon is aviation fuel. In further or additional embodiments, the liquid hydrocarbon comprises kerosene.

In yet further or additional embodiments, the filter is removable from the vehicle. In other embodiments, the filter is not removable from the vehicle.

What is claimed is:

1. A filtering device for filtration of fuel as it flows into an inlet neck of a fuel tank, said device comprising:
    an elongated tube including:
        a lower end including a plurality of barbed teeth;
        a top end having a ridge with an outside diameter greater than an inside diameter of the inlet neck to prevent the filter device from being completely inserted into the inlet neck;
        at least one longitudinally extending vent slot in an upper end of the elongated tube; and
    a conical mesh filter having a pore size ranging from 80 to 120 microns, wherein an upper end of said conical mesh filter sealingly engages the barbed teeth of said elongated tube.

2. The filtering device of claim 1, provided that the elongated tube comprises a thermoplastic material.

3. The filtering device of claim 1, provided that a greatest outside diameter of the elongated tube is from about 0.3 inches to about 1.6 inches.

4. The filtering device of claim 3, provided that a collar is located at least about 0.1 inches below the top end of the elongated tube.

5. The filtering device of claim 1, comprising at least 2 longer vent slots and at least 5 shorter vent slots.

* * * * *